United States Patent
Zheng et al.

(10) Patent No.: US 11,670,007 B2
(45) Date of Patent: Jun. 6, 2023

(54) DEVICE AND METHOD FOR DETECTING CIGARETTE FLY ASH BY GRAY-SCALE DIFFERENCE BASED ON MACHINE VISION (MV)

(71) Applicant: CHINA TOBACCO YUNNAN INDUSTRIAL CO., LTD, Kunming (CN)

(72) Inventors: Han Zheng, Kunming (CN); Jianbo Zhan, Kunming (CN); Ying Zhang, Kunming (CN); Hao Wang, Kunming (CN); Tao Wang, Kunming (CN); Ying Zhang, Kunming (CN); Zhenhua Yu, Kunming (CN); Xu Wang, Kunming (CN); Jiao Xie, Kunming (CN); Tingting Yu, Kunming (CN); Liwei Li, Kunming (CN); Haiyan Ding, Kunming (CN); Yao Yu, Kunming (CN); Li Jiang, Kunming (CN); Shuai Yang, Kunming (CN)

(73) Assignee: CHINA TOBACCO YUNNAN INDUSTRIAL CO., LTD, Kunming (CN)

(*) Notice: Subject to any disclaimer, the term of this patent is extended or adjusted under 35 U.S.C. 154(b) by 0 days.

(21) Appl. No.: 17/763,213

(22) PCT Filed: Jan. 21, 2021

(86) PCT No.: PCT/CN2021/073111
§ 371 (c)(1),
(2) Date: Mar. 24, 2022

(87) PCT Pub. No.: WO2022/057183
PCT Pub. Date: Mar. 24, 2022

(65) Prior Publication Data
US 2022/0358682 A1    Nov. 10, 2022

(30) Foreign Application Priority Data
Sep. 16, 2020   (CN) .......................... 202010976173.2

(51) Int. Cl.
*G06T 7/00* (2017.01)
*G06T 7/62* (2017.01)
(Continued)

(52) U.S. Cl.
CPC ............... *G06T 7/90* (2017.01); *G01N 31/12* (2013.01); *G06T 7/0004* (2013.01); *G06T 7/62* (2017.01)

(58) Field of Classification Search
CPC ......... G01N 31/12; G06T 7/0004; G06T 7/62; G06T 7/90
See application file for complete search history.

(56) References Cited

U.S. PATENT DOCUMENTS

2019/0021397 A1* 1/2019 Zhang .................... A24F 40/80

FOREIGN PATENT DOCUMENTS

| CN | 100545865 C | * | 9/2009 |
| CN | 101949862 A | * | 1/2011 |

(Continued)

OTHER PUBLICATIONS

Deng et al. ("Image Classification and Detection of Cigarette Combustion Cone Based on Inception Resnet V2," 5th International Conference on Computerand Communication Systems; Date of Conference: May 15-18, 2020) (Year: 2020).*

(Continued)

*Primary Examiner* — Yubin Hung
(74) *Attorney, Agent, or Firm* — Bayramoglu Law Offices LLC (57) ABSTRACT

A device and a method for detecting cigarette fly ash by a gray-scale difference based on machine vision (MV) are provided. A manipulator holds a cigarette as a detection sample to simulate a human smoking action, and multiple groups of cameras track a simulated smoking process of the detection sample synchronously in real time. It is determined whether fly ash appears based on a gray-scale difference of burning ash columns, produced without being subjected to flicking, in acquired images. A fly ash area of the burning ash columns of the cigarette is calculated by an area with the gray-scale difference of the burning ash columns of the cigarette in two sequential images of the burning ash columns of the cigarette, and a fly ash amount is further determined. The detection of the amount of fine fly ash is converted into the detection of the gray-scale difference.

11 Claims, 12 Drawing Sheets

(51) Int. Cl.
  *G06T 7/90*     (2017.01)
  *G01N 31/12*    (2006.01)

(56) References Cited

FOREIGN PATENT DOCUMENTS

| | | | | | |
|---|---|---|---|---|---|
| CN | 103292746 | A | * | 9/2013 | |
| CN | 103440484 | A | * | 12/2013 | |
| CN | 105352961 | A | * | 2/2016 | |
| CN | 107084985 | A | * | 8/2017 | |
| CN | 107328779 | A | * | 11/2017 | ............ G01N 21/84 |
| CN | 109215011 | A | | 1/2019 | |
| CN | 210414198 | U | * | 4/2020 | |
| CN | 111402193 | A | * | 7/2020 | |
| CN | 111426792 | A | | 7/2020 | |
| CN | 111426795 | A | | 7/2020 | |
| CN | 111830047 | A | | 10/2020 | |
| CN | 112085806 | A | | 12/2020 | |
| EP | 500302 | A2 | * | 8/1992 | ............ A24C 5/32 |
| EP | 0880020 | A1 | * | 11/1998 | |
| JP | 2002090471 | A | * | 3/2002 | |
| JP | 2006157494 | A | * | 6/2006 | |
| WO | 0197640 | A1 | | 12/2001 | |

OTHER PUBLICATIONS

Jin et al' ("Afire and flame detecting method based on video," International Conference on Machine Learning and Cybernetics; Date of Conference: Jul. 12-15, 2009) (Year: 2009).*
GB/T 16447-2004, Tobacco and tobacco products-Atmosphere for conditioning and testing, ISO 3402:1999,IDT, China Tobacco Standardization Research Center, 2004, pp. 1-2.

* cited by examiner

| Specification | No. | Image acquisition time after cigarette burning (s) | Image acquisition angles | | |
|---|---|---|---|---|---|
| | | | Angle 1 | Angle 2 | Angle 3 |
| Specification 1 | 1-1# | 382 |  |  |  |
| | | 384 |  |  |  |

| Specification | No. | Image acquisition time after cigarette burning (s) | Gray-scale images of ash columns | | |
|---|---|---|---|---|---|
| | | | Angle 1 | Angle 2 | Angle 3 |
| Specification 1 | 1-1# | 382 |  |  |  |
| | | 384 |  |  |  |
| | | Subtracted image |  |  |  |
| | | Identified fly ash area (mm$^2$) | 22.52 | 0 | 2.77 |
| | | Total fly ash area (mm$^2$) | 25.29 | | |
| | 1-2# | 302 |  |  |  |
| | | 308 |  |  |  |
| | | Subtracted image |  |  |  |
| | | Identified fly ash area (mm$^2$) | 0.02 | 2.89 | 5.12 |
| | | Total fly ash area (mm$^2$) | 8.03 | | |

FIG. 8

| | | | | | |
|---|---|---|---|---|---|
| Specification 2 | 2-1# | 310 |  |  |  |
| | | 320 |  |  |  |
| | | Subtracted image |  |  |  |
| | | Identified fly ash area (mm$^2$) | 8.54 | 0.01 | 0 |
| | | Total fly ash area (mm$^2$) | 8.55 | | |
| | 2-2# | 220 |  |  |  |
| | | 224 |  |  |  |
| | | Total fly ash area (mm$^2$) |  |  |  |
| | | Total fly ash area (mm$^2$) | 0.1 | 3.32 | 0 |
| | | Total fly ash area (mm$^2$) | 3.33 | | |
| Specification 3 | 3-1# | 444 |  |  |  |
| | | 448 |  |  |  |

FIG. 8-continued

| | | | | | |
|---|---|---|---|---|---|
| | | Total fly ash area (mm²) | | | |
| | | Total fly ash area (mm²) | 2.43 | 5.9 | 0 |
| | | Total fly ash area (mm²) | 8.33 | | |
| 3-2# | | 438 |  |  |  |
| | | 442 |  |  |  |
| | | Total fly ash area (mm²) |  |  |  |
| | | Identified fly ash area (mm²) | 4.12 | 3.01 | 0.06 |
| | | Total fly ash area (mm²) | 7.19 | | |

FIG. 8-continued

DEVICE AND METHOD FOR DETECTING CIGARETTE FLY ASH BY GRAY-SCALE DIFFERENCE BASED ON MACHINE VISION (MV)

CROSS REFERENCE TO THE RELATED APPLICATIONS

This application is the national phase entry of International Application No. PCT/CN2021/073111, filed on Jan. 21, 2021, which is based upon and claims priority to Chinese Patent Application No. 202010976173.2, filed on Sep. 16, 2020, the entire contents of which are incorporated herein by reference.

TECHNICAL FIELD

The present invention belongs to the technical field of cigarette fly ash detection, and relates to a method for detecting cigarette fly ash, in particular to a device and a method for detecting cigarette fly ash by a gray-scale difference based on machine vision (MV), which track a cigarette burning state in real time based on MV, and determine, compare and calculate cigarette fly ash through image processing.

BACKGROUND

With the development of cigarette production technology and the continuous improvement of consumers' requirements for the smoking quality of cigarettes, the ash cohesion performance of cigarettes during smoking is increasingly concerned by consumers. The cigarette ash falling during smoking will pollute the environment and stain the clothes of consumers. Therefore, improving the ash cohesion performance of cigarettes has always been one of the important research directions of the tobacco industry.

At present, the research on the ash cohesion performance of cigarettes is mainly through the comparison and evaluation of the ash cohesion effect of the ash column of the cigarettes formed after static burning. This method statically evaluates the ash cohesion performance of cigarettes, but consumers are concerned about the ash cohesion performance of cigarettes during smoking. In other words, the current method only compares and evaluates the overall ash column of the cigarette formed after burning to guide the improvement of the ash cohesion performance of the cigarette, which cannot objectively reflect the falling ash and fly ash of the cigarette during smoking.

Fly ash may pollute the environment, stain consumers' clothes, and cause resentment among non-smokers nearby. Therefore, it is of great significance to study the reduction of cigarette fly ash during smoking to meet consumer demand and ensure safety.

Due to the shortcomings of the existing detection technology as well as the high requirements for fly ash detection accuracy, the large number of detection samples and the short duration of fly ash during the cigarette burning process, it is hard to manually detect cigarette fly ash. Therefore, it is desirable to develop a detection device and method based on the characteristics of cigarette fly ash for the development of cigarettes.

The present invention is proposed for this purpose.

SUMMARY

The present invention aims to overcome the shortcomings of the prior art. The present invention first proposes an index of cigarette fly ash to characterize cigarette ash detached from a cigarette ash column produced without being subjected to flicking a cigarette during smoking.

Further, the present invention proposes a device and a method for detecting cigarette fly ash based on machine vision (MV). The present invention quantitatively detects the cigarette fly ash produced without being subjected to flicking the cigarette during smoking, that is, characterizes the cigarette ash falling away from the ash column. The present invention tracks the burning state of the cigarette in real time based on MV, determines the cigarette fly ash through image processing, and objectively and accurately characterizes the cigarette fly ash index, so as to guide cigarette formulation research and quality optimization and upgrading.

In order to achieve the above objective, the present invention adopts the following technical solutions.

A first aspect of the present invention provides a device for detecting cigarette fly ash based on machine vision (MV). The device includes a manipulator, a cigarette holder, a smoking tube, a flicking mechanism, an image acquisition device and an image processing device, where a working end of the manipulator is fixedly connected to the cigarette holder;

the cigarette holder is connected to the smoking tube;

the flicking mechanism is separately provided outside the manipulator;

the image acquisition device is provided on the working end of the manipulator;

the image processing device is connected to the image acquisition device;

the manipulator is configured to simulate a human smoking action;

the cigarette holder is configured to hold cigarettes of different specifications, such as circumferences;

the smoking tube is connected to a smoking cylinder for smoking;

the flicking mechanism is configured to flick ash by flicking the cigarette in a simulated smoking process;

the image acquisition device is configured to synchronously acquire images of burning ash columns of the cigarette during the simulated smoking process; and the image processing device is configured to: compare images of burning ash columns, produced without being subjected to flicking, of the cigarette synchronously acquired by the image acquisition device during the simulated smoking process; determine whether fly ash appears by a gray-scale difference of the burning ash columns of the cigarette in the images; determine that the fly ash appears if the gray-scale difference of the burning ash columns of the cigarette exists in two images; and calculate a fly ash amount by the gray-scale difference of the burning ash columns of the cigarette in the two images;

wherein, the burning ash columns of the cigarette in the two compared images are produced without being subjected to flicking.

The black-and-white image of an object displayed by a display receiver presents varying degrees of a gray color between white and black colors due to differences in the color and brightness of the object. The gray color is divided into several gray-scales, usually in the range of 0-255, wherein 255 indicates the white color, and 0 indicates the black color. The gray color of the burning ash column of the cigarette is represented by gray-scale values. Under the same conditions, a higher gray-scale value indicates a whiter burning ash column of the cigarette.

If the gray-scales of the burning ash columns of the cigarette in two images are different, it means that there is ash flying from the ash column. The gray-scale values of the ash column are consistent under the same conditions. When there is ash flying away from the ash column, the gray-scale value of the fly ash part on the ash column is different. Therefore, a difference of gray-scale values indicates that fly ash appears. When fly ash appears on the ash column formed by the burning of the cigarette, the color of the fly ash area becomes darker and the gray-scale value of this area decreases. The fly ash area of the burning ash column of the cigarette is calculated by the area with the gray-scale difference of the burning ash column of the cigarette in the previous and following images of the burning ash columns of the cigarette, so as to further determine the fly ash amount. The present invention cleverly converts the detection of the amount of fine fly ash into the detection of the gray-scale difference of the burning ash column of the cigarette, and the detection of the present invention is accurate and convenient.

The human smoking action includes characteristic actions and trajectories such as simulated smoking, bending over a desk, flicking, and turning the wrist after smoking. For the manipulator, reference may be made to the Chinese patent application 2020103296239 titled "MANIPULATOR FOR SIMULATING WHOLE CIGARETTE SMOKING PROCESS OF HUMAN AND SIMULATION METHOD THEREOF" filed on Apr. 20, 2020.

Preferably, the image acquisition device includes N cameras, wherein N>2.

Preferably, the flicking mechanism includes: a flicking support located outside the manipulator, a drive motor provided on the flicking support, a flicking lever provided at an output end of the drive motor, and a support plate provided on the flicking support to centralize the cigarette, wherein the support plate has a notch.

Preferably, when the human smoking action is simulated, a smoking regime developed by International Organization of Standardization (ISO), Federal Trade Commission (FTC), Massachusetts or Health Canada is adopted.

Preferably, when detecting that the fly ash appears, the image processing device calculates a fly ash area of a detection sample based on a set length of a burning ash column of the detection sample.

A second aspect of the present invention provides a method for detecting cigarette fly ash by a gray-scale difference based on MV, using the device for detecting cigarette fly ash based on MV according to the first aspect of the present invention. The method includes the following steps:

step (1): holding a cigarette on the cigarette holder, adjusting positions of the cigarette holder and the image acquisition device, such that the entire cigarette appears in an image acquired by a camera of the acquisition device;

step (2): lighting the cigarette on the cigarette holder; and acquiring, by the image acquisition device, images of the cigarette in the simulated smoking process in real time, and transmitting the acquired images to the image processing device; and step (3): performing, by the image processing device, condition screening on the received images, comparing images of burning ash columns of the cigarette that are produced without being subjected to flicking, determining whether fly ash appears by the gray-scale difference of the burning ash columns of the cigarette in the images, determining that the fly ash appears if the gray-scale difference of the burning ash columns of the cigarette exists in the two images, and calculating the fly ash area of the fly ash columns in the two images according to an area with the gray-scale difference of the burning ash columns.

In step (3), the condition screening performed by the image processing device on the received images is mainly to remove images of samples with respective ash columns broken during detection.

Preferably, in step (3), the fly ash area is calculated as follows:

sub-step (31): performing gray-scale processing on two sequential images of the burning ash columns of the cigarette;

sub-step (32): subtracting a previous image A of the burning ash column of the cigarette from a following image B of the burning ash column of the cigarette to obtain a subtracted image C, filtering out a part with a gray-scale difference less than a, and obtaining a remaining part as a fly ash area of the burning ash column of the cigarette in the following image B relative to the previous image A of the burning ash column of the cigarette; and sub-step (33): processing, according to sub-step (32), different groups of previous and following images of burning ash columns of the cigarette acquired by the image acquisition device, and accumulating fly ash areas obtained from the previous and following images of each group to obtain a total fly ash area of the burning ash columns of the cigarette in the following images relative to the burning ash columns of the cigarette in the previous images.

Preferably, when acquiring images of a cigarette burning process in real time, the image acquisition device acquires an image every 1 second.

Preferably, in sub-step (32), in filtering out the part with the gray-scale difference less than a, a is equal to 30, wherein a part with a gray-scale difference greater than a indicates a gray-scale change caused by the fly ash, and the part with the gray-scale difference less than a indicates a gray-scale change of a natural burning ash column of the cigarette. By filtering out the part with the gray-scale difference less than a, the gray change of the ash column itself during the natural burning of the cigarette is ignored, so as to accurately grasp the gray-scale change caused by the fly ash.

Compared with the prior art, the present invention has the following beneficial effects:

1. The present invention first proposes the index of cigarette fly ash to characterize the cigarette ash detached from the cigarette ash column produced without being subjected to flicking during smoking. This index objectively and accurately reflects the ash column falling off without being subjected to flicking during smoking that consumers are concerned about.

2. The present invention determines whether fly ash appears according to the gray-scale difference of the burning ash column of the cigarette. When fly ash appears on the ash column formed by the burning of the cigarette, the color of the fly ash area becomes darker and the gray-scale value of this area decreases. The fly ash area of the burning ash column of the cigarette is calculated by the area with the gray-scale difference of the burning ash column of the cigarette in the previous and following images of the burning ash columns of the cigarette, so as to further determine the fly ash amount. The present invention cleverly converts the detection of the amount of fine fly ash into the detection of the gray-scale difference of the burning ash column of the cigarette, and the detection of the present invention is accurate and convenient.

3. The present invention provides an MV-based cigarette fly ash detection device, and establishes a detection method for acquiring, processing and quantifying cigarette fly ash by an image difference method based on a simulated human smoking process. The detection method of the present invention is fast, accurate and easy to popularize.
4. The image acquisition device 5 of the detection device of the present invention includes N cameras, wherein N>2, and the multiple cameras can simultaneously capture the burning state of the cigarette with multi-angle full vision, which improves the accuracy of cigarette fly ash image acquisition.
5. Compared with the method of subjectively determining cigarette fly ash and fly ash amount based on manual smoking experience, the present invention overcomes the influence of subjective factors, provides a quantitative detection method with high repeatability, high objectivity and high reliability. The present invention can more accurately evaluate product differences, guide research work on relevant cigarette formulations, and improve cigarette quality.

BRIEF DESCRIPTION OF THE DRAWINGS

Reference Numerals: 1. manipulator; 2. cigarette holder; 3. smoking tube; 4. flicking mechanism; 5. image acquisition device; 6. image processing device; 7. flicking support; 8. drive motor; 9. flicking lever; 10. support plate; and 11. cigarette.

DETAILED DESCRIPTION OF THE EMBODIMENTS

The present invention will be further described in detail below with reference to the embodiments.

Those skilled in the art should understand that the following embodiments are only intended to illustrate the present invention, rather than to limit the scope of the present invention. For techniques or conditions not indicated in the embodiments, refer to those described in documents in this field or product specifications. Materials or equipment that do not specify a manufacturer are conventional products available for purchase.

Those skilled in the art can understand that, unless otherwise stated, the singular forms "a", "an", "said" and "the" used herein may also include plural forms. It should be further understood that the word "comprising" used in the specification of the present invention refers to the presence of the described features, integers, steps, operations, elements and/or components, but does not exclude the presence or addition of one or more other features, integers, steps, operations, elements, components, and/or groups thereof. It should be understood that when an element is "connected" to another element, it may be connected to another element directly or through an intermediate element. In addition, the "connected" used herein may include wireless connection.

In the description of the present invention, unless otherwise specified, "multiple" means at least two. The terms such as "inner", "upper" and "lower" are intended to indicate an orientation or state relationship shown in the drawings. It should be noted that these terms are merely intended to facilitate a simple description of the present invention, rather than to indicate or imply that the mentioned apparatus or elements must have the specific orientation or be constructed and operated in the specific orientation. Therefore, these terms may not be construed as a limitation to the present invention.

It should be noted that, in the description of the present invention, unless otherwise clearly specified, meanings of terms such as "mounted", "connected to", and "provided with" should be understood in a broad sense. For example, a connection may be a fixed connection, a removable connection, an integral connection, a mechanical connection, an electrical connection, a direct connection or an indirect connection through a medium. Those of ordinary skill in the art should understand specific meanings of the above terms in the present invention based on a specific situation.

Those skilled in the art should understand that, unless otherwise defined, all terms (including technical terms and scientific terms) used herein have the same meaning as those commonly understood by those of ordinary skill in the art to which the present invention belongs. It should also be understood that terms such as those defined in general dictionaries should be understood as having meanings consistent with the meanings in the context of the prior art, and unless otherwise defined herein, these terms will not be explained in ideal or overly-formal meanings.

Figure 1:
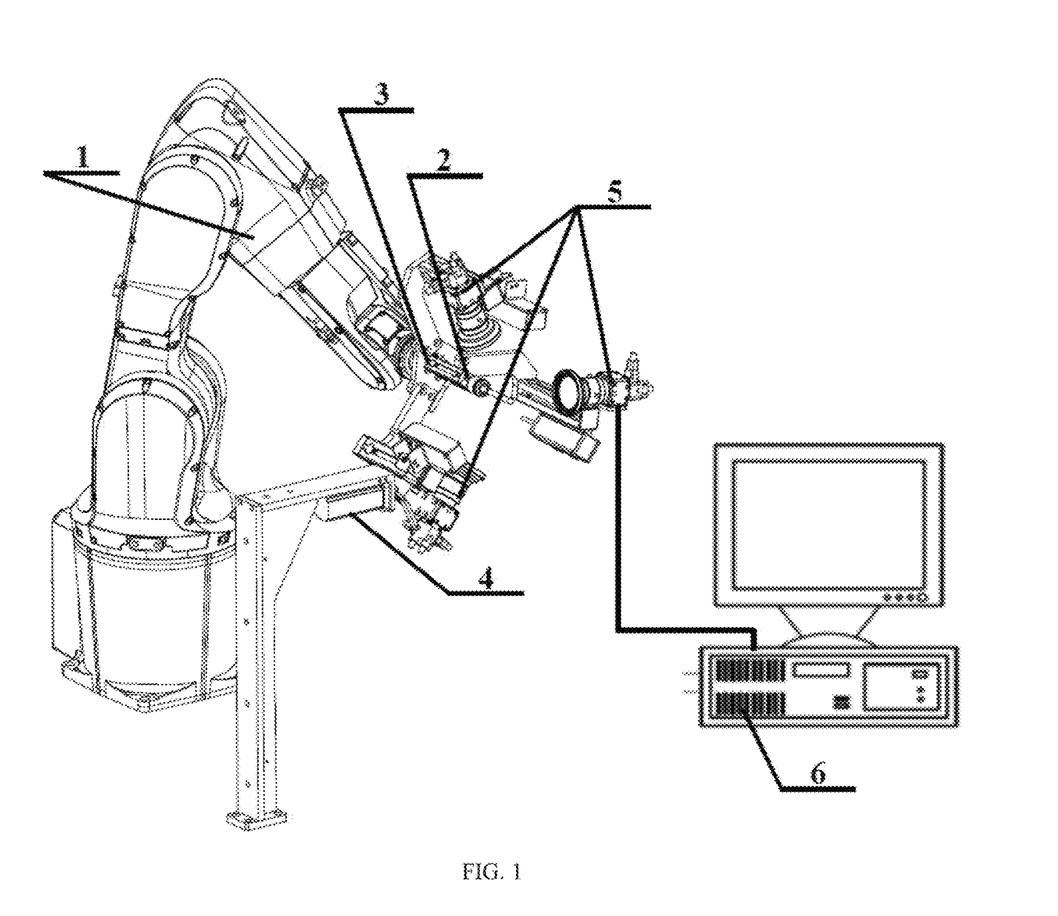
FIG. 1 is a structural view of a device for detecting cigarette fly ash based on machine vision (MV) according to the present invention.
Figure 2:
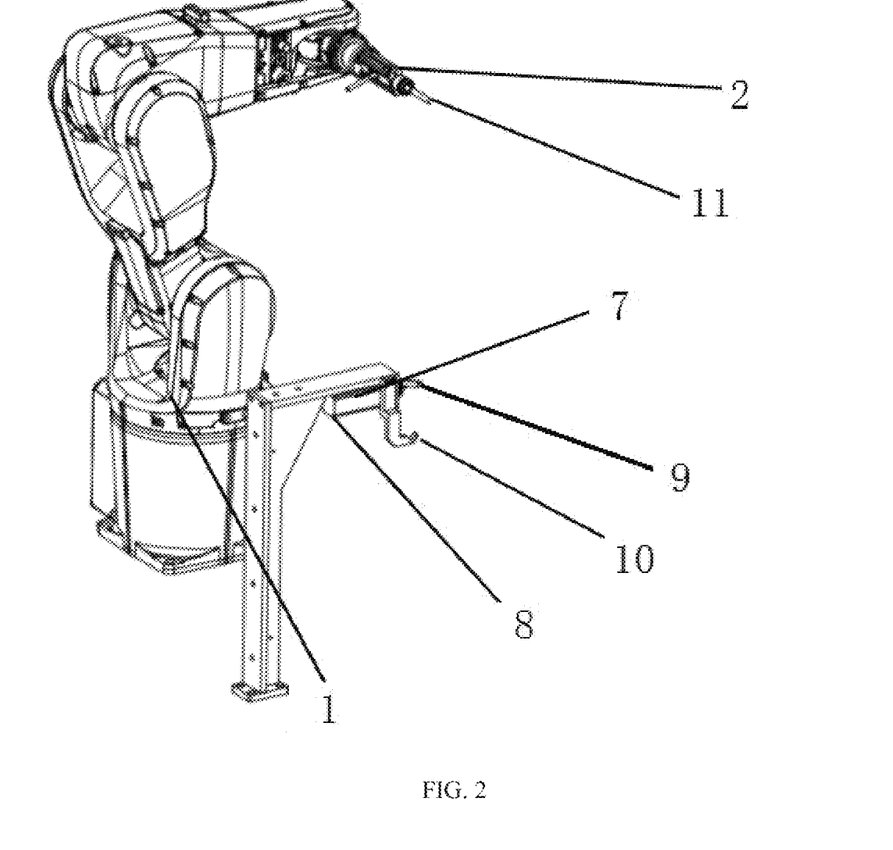
FIG. 2 shows relative positions of a manipulator and a flicking mechanism of the device according to the present invention.

As shown in FIGS. 1 and 2, a device for detecting cigarette fly ash based on machine vision (MV) includes a manipulator 1, a cigarette holder 2, a smoking tube 3, a flicking mechanism 4, an image acquisition device 5 and an image processing device 6, where a working end of the manipulator 1 is fixedly connected to the cigarette holder 2;

the cigarette holder 2 is connected to the smoking tube 3;

the flicking mechanism 4 is separately provided outside the manipulator 1;

the image acquisition device 5 is provided on the working end of the manipulator 1;

the image processing device 6 is connected to the image acquisition device 5;

the manipulator 1 is configured to simulate a human smoking action;

the cigarette holder 2 is configured to hold cigarettes of different specifications, such as circumferences;

the smoking tube 3 is connected to a smoking cylinder for smoking;

the flicking mechanism 4 is configured to flick ash by flicking the cigarette in a simulated smoking process;

the image acquisition device 5 is configured to synchronously acquire images of burning ash columns of the cigarette during the simulated smoking process; and the image processing device 6 is configured to: compare images of burning ash columns, produced without being subjected to flicking, of the cigarette synchronously acquired by the image acquisition device 5 during the simulated smoking process; determine whether fly ash appears by a gray-scale difference of the burning ash columns of the cigarette in the images; determine that fly ash appears if there is the gray-scale difference of the burning ash columns of the cigarette in two images; and calculate a fly ash amount by the gray-scale difference of the burning ash columns of the cigarette in the two images;

wherein, the burning ash columns of the cigarette in the two compared images are produced without being subjected to flicking.

It is determined that fly ash appears according to the gray-scale difference of the burning ash columns of the cigarette in two images. When fly ash appears on the ash column formed by the burning of the cigarette, the color of the fly ash area becomes darker and the gray-scale value of this area decreases. The fly ash area of the burning ash column of the cigarette is calculated by the area with the gray-scale difference of the burning ash column of the cigarette in the previous and following images of the burning ash columns of the cigarette, so as to further determine the fly ash amount. The present invention cleverly converts the detection of the amount of fine fly ash into the detection of the gray-scale difference of the burning ash column of the cigarette, and the detection of the present invention is accurate and convenient.

The image acquisition device 5 includes three cameras. The flicking mechanism 4 includes: a flicking support 7 located outside the manipulator 1, a drive motor 8 provided on the flicking support 7, a flicking lever 9 provided at an output end of the drive motor 8, and a support plate 10 provided on the flicking support 7 to centralize the cigarette, where the support plate 10 has a notch. When the human smoking action is simulated, a smoking regime developed by International Organization of Standardization (ISO) is adopted. When detecting that the fly ash appears, the image processing device 6 calculates a fly ash area of a detection sample based on a set length of a burning ash column of the detection sample.

The device for detecting cigarette fly ash based on MV detects according to the following steps:

Step (1): Hold a cigarette on the cigarette holder 2, adjust positions of the cigarette holder 2 and the image acquisition device 5, such that the entire cigarette appears in an image acquired by a camera of the acquisition device 5.

Step (2): Light the cigarette on the cigarette holder 2; and acquire, by the image acquisition device 5, images of the cigarette in a simulated smoking process in real time, and transmit the acquired images to the image processing device 6.

Step (3): Perform, by the image processing device 6, condition screening on the received images, compare images of burning ash columns of the cigarette that are produced without being subjected to flicking, determine whether fly ash appears by the gray-scale difference of the burning ash columns of the cigarette in the images, determine that the fly ash appears if the gray-scale difference of the burning ash columns of the cigarette exists in the two images, and calculate the fly ash area of the fly ash columns in the two images according to an area with the gray-scale difference of the burning ash columns.

In Step (3), the fly ash area is calculated as follows:

Sub-step (31): Perform gray-scale processing on two sequential images of the burning ash columns of the cigarette.

Sub-step (32): Subtract a previous image A of the burning ash column of the cigarette from a following image B of the burning ash column of the cigarette to obtain a subtracted image C, filter out a part with a gray-scale difference less than a, and obtain a remaining part as a fly ash area of the burning ash column of the cigarette in the following image B relative to the previous image A of the burning ash column of the cigarette.

Sub-step (33): Process, according to sub-step (32), three groups of previous and following images of burning ash columns of the cigarette acquired by three cameras of the image acquisition device 5, and accumulate fly ash areas obtained from the previous and following images of three groups to obtain a total fly ash area of the burning ash columns of the cigarette in the following images relative to the burning ash columns of the cigarette in the previous images.

When acquiring images of a cigarette burning process in real time, the image acquisition device 5 acquires an image every 1 second. In Sub-step (32), in filtering out the part with the gray-scale difference less than a, a is equal to 30, wherein a part with a gray-scale difference greater than a indicates a gray-scale change caused by the fly ash, and the part with the gray-scale difference less than a indicates a gray-scale change of a natural burning ash column of the cigarette. By filtering out the part with the gray-scale difference less than a, the gray change of the ash column itself during the natural burning of the cigarette is ignored, so as to accurately grasp the gray-scale change caused by the fly ash.

Figure 3:
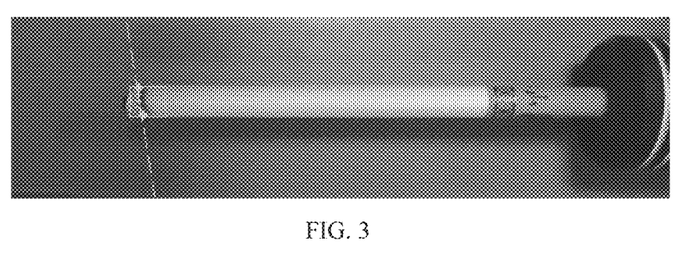
FIG. 3 shows an image acquired during detection.
Figure 4:
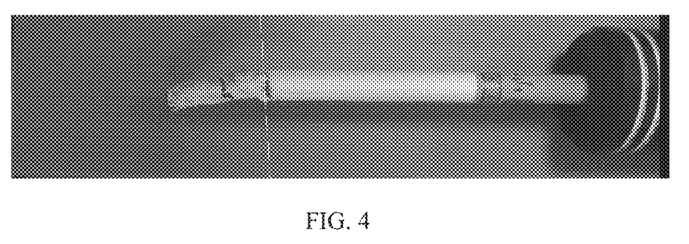
FIG. 4 shows another image acquired during detection.

In FIGS. 3 and 4, the dotted line represents a burning carbon line, and the square represents a detection area. The detection area varies with the burning carbon line so as to significantly reduce external disturbances. Cigarette paper is mostly white or light-colored, and the burning carbon line of cigarettes is black or dark. According to this feature, the present invention tracks the burning position of the cigarettes in real time. According to the position of the burning carbon line, the burning position of the cigarette is tracked.

Figure 5:
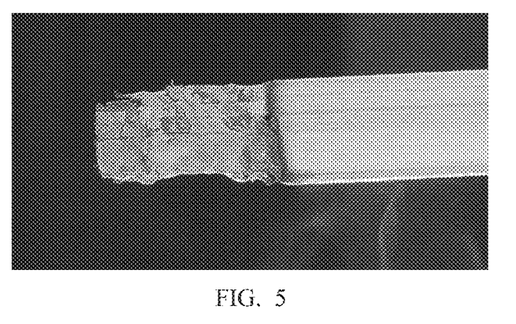
FIG. 5 is a partial structural view of a burning ash column of a cigarette before fly ash appears.
Figure 6:
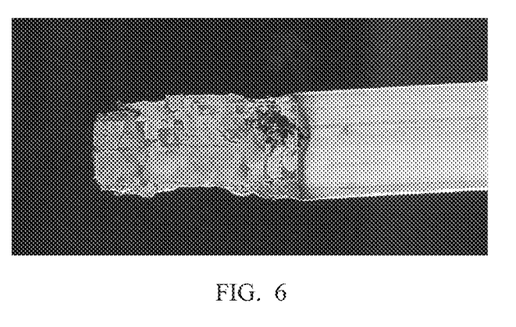
FIG. 6 is a partial structural view of a burning ash column of the cigarette after fly ash appears.

As shown in FIGS. 5 and 6, in the two images, when the cigarette is not flicked in the process of smoking, there are obvious areas with gray-scale differences, indicating the appearance of fly ash, and the fly ash is calculated.

EMBODIMENT

During the detection process, when images are acquired, a light-emitting diode (LED) light source is used to illuminate and fill the sample detection environment to ensure sufficient and stable light in the detection environment and reduce the interference of the external environment on image acquisition.

Detection samples: This detection method is suitable for cigarette samples of various specifications. In this embodiment, according to the above-mentioned implementation, three types of conventional cigarettes with a circumference of 24.3 mm and a length of 84.0 mm are detected.

Detection Configuration:

Control system—Analysis software: FZ-PanDA (OMRON Japan); Light source: JL-LR-100X30 (Jiali, China); Camera model: FH-SC04 (OMRON, Japan), lens model: 3Z4S-LE (OMRON, Japan).

Detection environment—temperature: $(22\pm2°)C.$, relative humidity: $(60\pm5)\%$.

The Operation Steps are as Follows:

Step (1): The cigarette samples to be detected are placed in a single layer evenly in an environment specified in GB/T 16447 and equilibrated for 48 h.

Step (2): The equilibrated cigarette samples are held on the cigarette holder, and the position of the image acquisition device is adjusted, such that the entire cigarette is located at the image acquisition center of each camera.

Step (3): The image acquisition device and the image processing device are turned on.

Step (4): The cigarette sample is lit, the manipulator and the smoking cylinder are started, and the detection is carried out under an ISO standard smoking regime. The simulated smoking action of the manipulator is performed according to the waiting time of 40 seconds at a desk, the smoking angle of 30° at the desk, and the wrist turning angle of 90° after smoking.

Step (5): The image acquisition device acquires images of the cigarette burning process in real time, and acquires an image every 1 second as set.

Image Processing Flow:

Step (6): Gray-scale processing is performed on previous and following images of the burning ash columns of the cigarette.

A previous image A of a burning ash column of the cigarette is subtracted from a following image B of a burning ash column of the cigarette to obtain a subtracted image C, a part with a gray-scale difference less than a is filtered out, and a remaining part is obtained as a fly ash area of the burning ash column of the cigarette in the following image B relative to the previous image A of the burning ash column of the cigarette.

According to the above sub-step, different groups of previous and following images of burning ash columns of the cigarette acquired by the image acquisition device 5 are processed, and fly ash areas obtained from the previous and following images of each group are accumulated to obtain a total fly ash area of the burning ash columns of the cigarette in the following images relative to the burning ash columns of the cigarette in the previous images.

Figure 7:
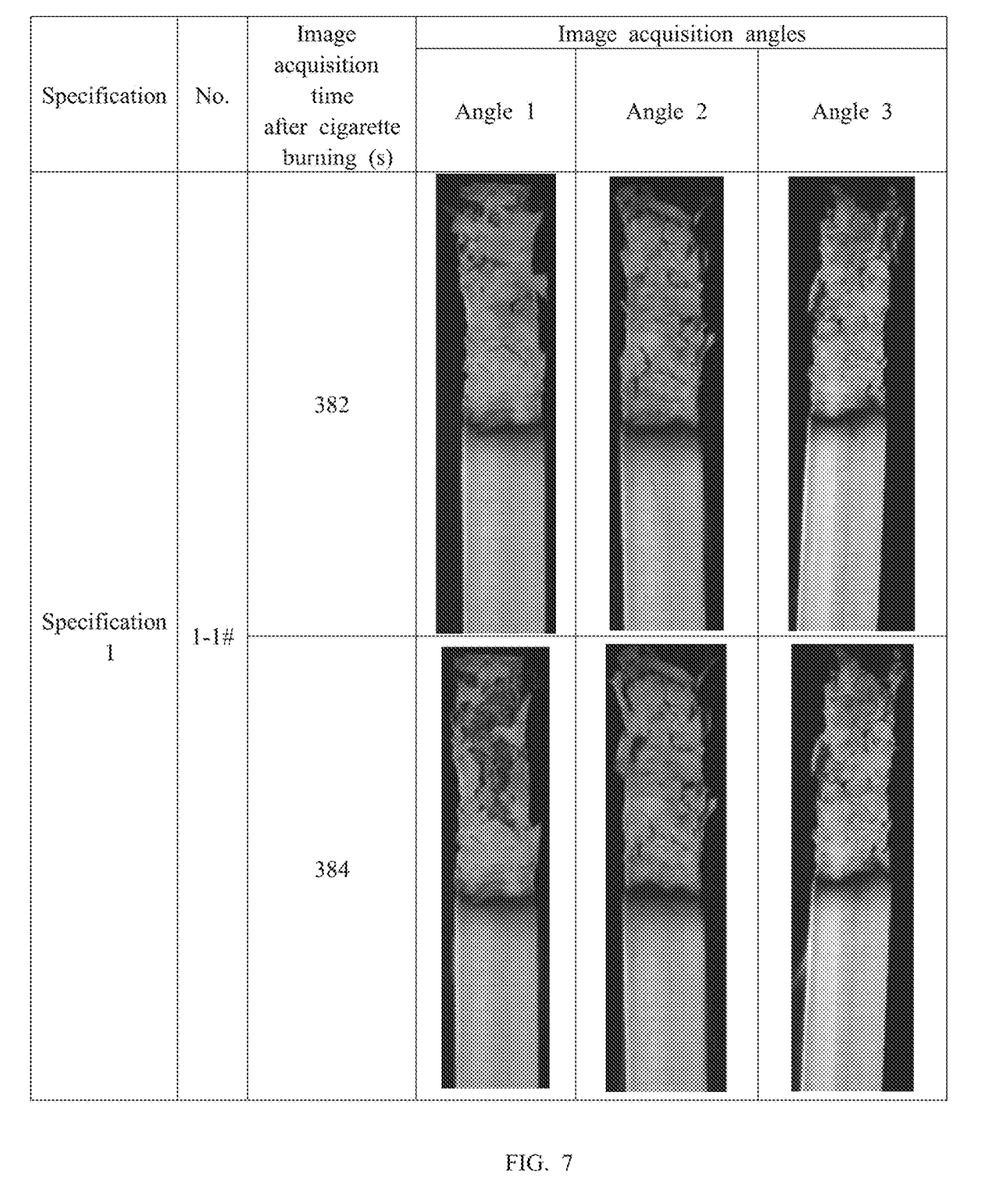
FIG. 7 shows images of fly ash of samples of different specifications taken from different angles.
Figure 8:
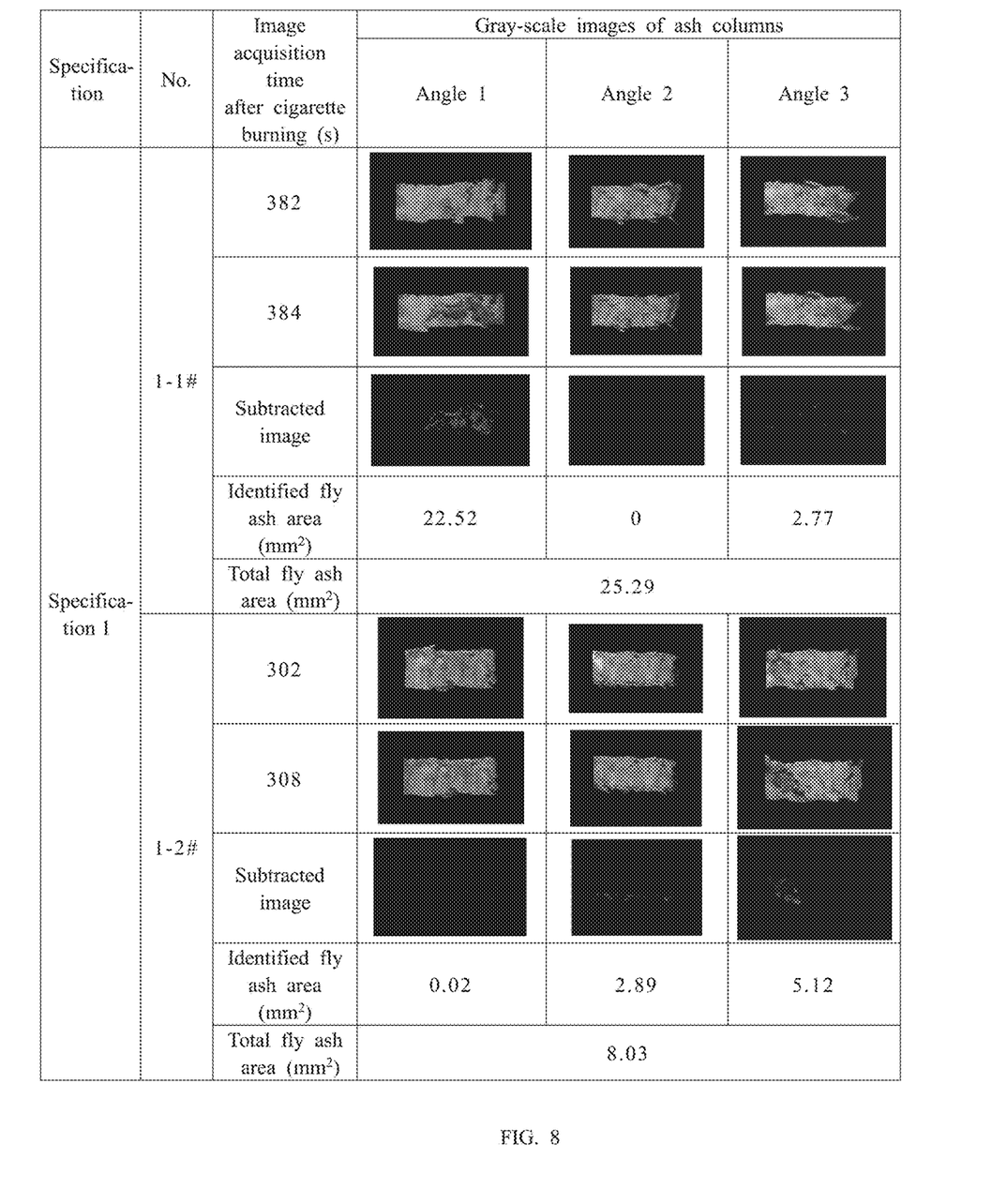
FIG. 8 shows fly ash of samples of different specifications taken from different angles.

The time and image of the samples with fly ash in the detection are recorded, and two samples of each specification are selected to characterize the fly ash results, as shown in FIGS. 8 and 7.

It can be seen from the embodiment that the cigarettes of different specifications all have fly ash during the burning process. The 1-1 # sample of specification 1 has a greater fly ash area during the smoking process. By comparing the images acquired at intervals of 2 seconds, the total fly ash area on the burning ash columns of the cigarette is 25.29 mm$^2$. In this embodiment, in the images of the burning ash columns of the cigarette acquired by the three groups of cameras, if the fly ash happens to appear at the edge of the burning ash column of the cigarette, the fly ash may appear in the images acquired by different cameras. However, the overlapping area of the images acquired by the three groups of cameras is very small, which can be ignored in this embodiment. In addition, the overlap does not affect the comparison between different cigarette samples made by the detection device. The present invention can effectively acquire and quantify cigarette fly ash, and compare the fly ash difference of cigarettes, so as to guide the optimization and upgrading of cigarettes.

The basic principles, main features and advantages of the present invention are described above. Those skilled in the art should understand that the present invention is not limited by the above embodiments, and the descriptions in the above embodiments and specification are merely used for illustrating principles of the present invention. The present invention may have various modifications and improvements without departing from the spirit and scope of the present invention, and all these modifications and improvements should fall within the protection scope of the present invention. The protection scope of the present invention is defined by the appended claims and equivalents thereof.

What is claimed is:

1. A device for detecting cigarette fly ash based on machine vision (IV), comprising a manipulator, a cigarette holder, a smoking tube, a flicking mechanism, an image acquisition device comprising two or more cameras and an image processing device, wherein
    a working end of the manipulator is fixedly connected to the cigarette holder;
    the cigarette holder is connected to the smoking tube;
    the flicking mechanism is separately provided outside the manipulator;
    the image acquisition device is provided on the working end of the manipulator;
    the image processing device is connected to the image acquisition device;
    the manipulator is configured to simulate a human smoking action;
    the cigarette holder is configured to hold cigarettes of different specifications, such as circumferences;
    the smoking tube is connected to a smoking cylinder for smoking;
    the flicking mechanism is configured to flick ash by flicking a cigarette in a simulated smoking process;
    the image acquisition device is configured to synchronously acquire sequences of images, one for each camera, of burning ash columns of a cigarette held in the cigarette holder during the simulated smoking process, wherein the burning ash columns are produced without being subjected to flicking; and
    the image processing device is configured to, for each sequence of images:
        compare images $I_1$ and $I_2$ of burning ash columns acquired by the corresponding camera at time $t_1$ and $t_2$, with $t_1 < t_2$, during the simulated smoking process;
        determine whether fly ash appears by a gray-scale difference of the burning ash columns of the cigarette in the images;
        determine that the fly ash appears if the gray-scale difference of the burning ash columns of the cigarette exists between two images; and
        calculate a fly ash amount by the gray-scale difference of the burning ash columns of the cigarette in the two images.

2. The device for detecting the cigarette fly ash based on the MV according to claim 1, wherein the flicking mechanism comprises:
    a flicking support located outside the manipulator,
    a drive motor provided on the flicking support,
    a flicking lever provided at an output end of the drive motor, and
    a support plate provided on the flicking support to centralize the cigarette, wherein the support plate has a notch.

3. The device for detecting the cigarette fly ash based on the MV according to claim 1, wherein, when the human smoking action is simulated, a smoking regime developed by International Organization of Standardization (ISO), Federal Trade Commission (FTC), Massachusetts or Health Canada is adopted.

4. The device for detecting the cigarette fly ash based on the MV according to claim 1, wherein the fly ash area is calculated based on a set length of a burning ash column of the cigarette.

5. A method for detecting cigarette fly ash by a gray-scale difference based on MV, using the device for detecting the cigarette fly ash based on the MV according to claim 1, wherein the method comprises the following steps:
- step (1): holding a cigarette on the cigarette holder, adjusting positions of the cigarette holder and the image acquisition device such that the entire cigarette appears in an image acquired by each of the two or more cameras of the acquisition device;
- step (2): lighting the cigarette;
  - synchronously acquiring, by the image acquisition device, one sequence of images per camera of burning ash columns of the cigarette in a simulated smoking process in real time, wherein the burning ash columns of the cigarette that are produced without being subjected to flicking; and
  - transmitting the acquired sequences of images to the image processing device; and
- step (3): performing, by the image processing device, condition screening on the received sequences of images, comprising, for each sequence:
  - comparing images $I_1$ and $I_2$ acquired by the corresponding camera at time $t_1$ and $t_2$, with $t_1 < t_2$, during the simulated smoking process burning ash columns of the cigarette that are produced without being subjected to flicking,
  - determining whether fly ash appears by the gray-scale difference of the burning ash columns of the cigarette in the images,
  - determining that the fly ash appears if the gray-scale difference of the burning ash columns of the cigarette exists between the two images, and
  - calculating the fly ash area of the fly ash columns in the two images according to an area with the gray-scale difference of the burning ash columns;
- step (4): accumulating fly ash areas obtained for the sequences to obtain a total fly ash area of the burning ash columns of the cigarette between times $t_1$ and $t_2$.

6. The method for detecting the cigarette fly ash by the gray-scale difference based on the MV according to claim 5, wherein in step (3), the fly ash area is calculated as follows:
- sub-step (31): performing gray-scale processing on images $I_1$ and $I_2$;
- sub-step (32): subtracting image $I_1$ from image $I_2$ to obtain a subtracted image C, filtering out a part of C with a gray-scale difference less than a threshold TH, and obtaining a remaining part as a fly ash area of the burning ash column of the cigarette image $I_2$ relative to image $I_1$.

7. The method for detecting the cigarette fly ash by the gray-scale difference based on the MV according to claim 6, wherein, in sub-step (32), TH is equal to 30, wherein a part with a gray-scale difference greater than TH indicates a gray-scale change caused by the fly ash, and the part with the gray-scale difference less than TH indicates a gray-scale change of a natural burning ash column of the cigarette.

8. The method for detecting the cigarette fly ash by the gray-scale difference based on the MV according to claim 5, wherein when acquiring images of a cigarette burning process in real time, the image acquisition device acquires an image every 1 second.

9. The method for detecting the cigarette fly ash by the gray-scale difference based on the MV according to claim 5, wherein the flicking mechanism comprises:
- a flicking support located outside the manipulator,
- a drive motor provided on the flicking support,
- a flicking lever provided at an output end of the drive motor, and
- a support plate provided on the flicking support to centralize the cigarette, wherein the support plate has a notch.

10. The method for detecting the cigarette fly ash by the gray-scale difference based on the MV according to claim 5, wherein, when the human smoking action is simulated, a smoking regime developed by International Organization of Standardization (ISO), Federal Trade Commission (FTC), Massachusetts or Health Canada is adopted.

11. The method for detecting the cigarette fly ash by the gray-scale difference based on the MV according to claim 5, wherein, wherein the fly ash area is calculated based on a set length of a burning ash column of the cigarette.

* * * * *

UNITED STATES PATENT AND TRADEMARK OFFICE
CERTIFICATE OF CORRECTION

| | | |
|---|---|---|
| PATENT NO. | : 11,670,007 B2 | Page 1 of 1 |
| APPLICATION NO. | : 17/763213 | |
| DATED | : June 6, 2023 | |
| INVENTOR(S) | : Han Zheng et al. | |

It is certified that error appears in the above-identified patent and that said Letters Patent is hereby corrected as shown below:

On the Title Page

Item (72) The 6th to 9th inventors should be:
Xu WANG; Jiao XIE; Zhenhua YU; Geng LI Signed and Sealed this
Twenty-sixth Day of September, 2023

Katherine Kelly Vidal
*Director of the United States Patent and Trademark Office*